United States Patent [19]

Sase

[11] Patent Number: 4,805,011
[45] Date of Patent: Feb. 14, 1989

[54] LUMINANCE SIGNAL FORMING CIRCUIT FOR COLOR TV CAMERA WHICH COMBINES LUMINANCE SIGNAL DERIVED FROM PRIMARY COLOR SIGNALS WITH LUMINANCE SIGNAL DERIVED FROM COMPLEMENTARY COLOR SIGNALS

[75] Inventor: Masatoshi Sase, Kanagawa, Japan
[73] Assignee: Sony Corporation, Tokyo, Japan
[21] Appl. No.: 100,223
[22] Filed: Sep. 23, 1987

[30] Foreign Application Priority Data

Sep. 27, 1986 [JP] Japan ............................ 61-229073
Dec. 23, 1986 [JP] Japan ............................ 61-307168

[51] Int. Cl.$^4$ .................. H04N 9/077; H04N 9/64; H04N 9/73
[52] U.S. Cl. ........................... 358/44; 358/29; 358/39
[58] Field of Search .............. 358/29 C, 39, 41, 43, 358/44

[56] References Cited

U.S. PATENT DOCUMENTS

| | | | |
|---|---|---|---|
| 4,205,336 | 5/1980 | Nagumo | 358/43 |
| 4,390,895 | 6/1983 | Sato et al. | 358/44 |
| 4,415,923 | 11/1983 | Noda | 358/39 |
| 4,517,588 | 5/1985 | Kuwayama et al. | 358/44 |
| 4,638,352 | 1/1987 | Noda et al. | 358/44 |
| 4,688,085 | 8/1987 | Imaide | 358/44 |
| 4,714,955 | 12/1987 | Nishimura et al. | 358/44 |
| 4,725,881 | 2/1988 | Buchwald | 358/43 |

FOREIGN PATENT DOCUMENTS

57-97286  6/1982  Japan ............................ 358/44
58-179083 10/1983 Japan ............................ 358/44

Primary Examiner—James J. Groody
Assistant Examiner—Randall S. Svihla
Attorney, Agent, or Firm—Lewis H. Eslinger; Jay H. Maioli

[57] ABSTRACT

A luminance signal is formed from a first luminance signal produced by mixing a plurality of complementary color signals obtained from a television camera having complementary color filters and from a second luminance signal produced by mixing at a predetermined ratio a plurality of primary color signals that are derived from the plurality of complementary color signals, the first and second luminance signals are then mixed so that the composite output signal forms the desired luminance signal. The first luminance signal is level adjusted based upon the color temperature detection signal derived from a color temperature detector and a second luminance signal is balanced in level based upon this color temperature detection signal. The second luminance signal is derived by mixing the three primary color signals at a predetermined ratio. This ratio is variable and can be controlled in response to an automatic gain control signal derived from an automatic gain control circuit that receives the output of the television camera.

22 Claims, 6 Drawing Sheets

LUMINANCE SIGNAL FORMING CIRCUIT FOR COLOR TV CAMERA WHICH COMBINES LUMINANCE SIGNAL DERIVED FROM PRIMARY COLOR SIGNALS WITH LUMINANCE SIGNAL DERIVED FROM COMPLEMENTARY COLOR SIGNALS

BACKGROUND OF THE INVENTION

1. Field of the Invention

This invention relates generally to luminance signal forming circuitry and, more particularly, to a luminance signal forming circuit applicable to a color television camera using complementary color filters.

2. Description of the Background

As is well known, complementary color filters are used to block a selected color component of the primary colors, that is, red (R), green (G), and blue (B). A yellow ($Y_E$) complementary filter passes R and G components therethrough, a cyan ($C_Y$) complementary filter passes G and B components therethrough, a magenta ($M_G$) complementary filter passes R and B components therethrough, and a white (W) complementary filter passes all R, G, and B primary color signals therethrough.

Thus, two or more primary color components (R and G, G and B, R and B, or R, G, and B) can pass through a single filter when these complementary color filters are used in a color television camera. Therefore, by reducing the number of filters in the light path, the quantity of light of the primary color signals incident on the image pickup device, such as an image pickup tube or a solid-state image pickup device, is increased. Accordingly, even when the image comprises a dark object a video signal output having a high level can be obtained from a camera using complementary filters.

In a conventional complementary color television camera of this kind, the video signal produced by the image pickup device is transmitted as a luminance signal through a low-pass filter (LPF) that functions as a simple composing circuit for the outputs from the camera. This low-pass filter may be through of as a separate luminance signal system that is provided to prevent the complementary color filters from losing their advantage, that is, high output from limited image brightness, and also to prevent noise from mixing with the luminance signal.

When a luminance signal is generated by simply composing or adding video output signals through a low-pass filter, as in the above-described proposed complementary color television camera, it is difficult to satisfy all three of the following conditions because of the inherent characteristics of the luminance signal.

In regard to the first condition, in general the ratio of the primary color signals, that is, the R, G, and B signals included in the luminance signal Y of the color television camera, is determined by the individual standard television scheme. For example, in the NTSC scheme, the ratio of R, G, and B primary color signals is standardized at 0.3:0.59:0.11. This means that the luminance (Y) can be expressed as follows:

$$Y = 0.3R + 0.59G + 0.11B \quad (1)$$

In practice, complementary color filters are designed to generate a luminance signal having a ratio close to that of the above and the luminance reproducibility or fidelity of the filtesr is optimized as the luminance signal approaches the exact ratio of equation (1).

As the second condition, in the complementary color television camera, the R, G, and B primary color signals are obtained by matrixing a plurality of complementary color signals obtained from the image pickup device, however, if there are variations in the sensitivity of the plurality of image pickup devices with respect to the complementary color signals, then folded distortion may be mixed with the luminance signal. Folded distortion is the so-called folding noise that is known in the field of signal sampling.

For example, in a complementary color television camera having the $Y_E$ and $C_Y$ complementary color filters, as well as the white color filter (W) for transmitting the R, G, and B primary color signals therethrough, if the B, R, and G primary color signals are obtained by performing operations represented by the following equations on the basis of the W, $Y_E$, and $C_Y$ complementary color signals obtained from an image pickup device, the W, $Y_E$, and $C_Y$ complementary color signals are sampled during one pixel period 1T, as shown in FIG. 1. This is also represented as follows:

$$W - Y_E = (R+G+B) - (R+G) = B \quad (2)$$

$$W - C_Y = (R+G+B) - (B+G) = R \quad (3)$$

$$Y_E + C_Y - W = (R+G) + (B+G) - (R+G+B) = G \quad (4)$$

In this case, each of the periods of the W, $Y_E$, and $C_Y$ complementary color signals is three times the sampling frequency used for sequentially sampling the W, $Y_E$, and $C_Y$ complementary color signals. More specifically, W, $Y_E$, and $C_Y$ are sequentially sampled by a sampling signal having a first frequency, so that each obtained W, $Y_E$, and $C_Y$ output signal has a frequency equal to one-third that of the first sampling frequency. Thus, each of the obtained outputs W, $Y_E$, and $C_Y$ has a period that is three times longer than that of the sampling signal having the first frequency.

Accordingly, as shown in FIG. 2, in the signal components of the video output signal from the image pickup device, the W, $Y_E$, and $C_Y$ complementary color signal components are produced at a position corresponding to a sampling frequency $f_s$ on a spatial frequency axis f, and the W, $Y_E$, and $C_Y$ complementary color signal components having mutual respective phase differences of 120° are also produced at positions of $f_s/3$ and $2f_s/3$, respectively. Further lower and upper sideband modulation signal components LB1 and UB1, and LB2 and UB2 having the sampling positions $\frac{1}{3}f_s$ and $\frac{2}{3}f_s$ as the centers are also produced.

The lower sideband modulation signal LB1 of the W, $Y_e$ and $C_Y$ complementary color signal components having a frequency of $f_s/3$ may be folded back so as to reach the baseband luminance signal component Y and can become mixed in a comparatively high-frequency range of the luminance signal component Y. This folding back and mixing causes degradation of the image quality, for example, fringe patterns will appear in a reproduced image, in accordance with the so-called folded distortion.

In regard to the third condition, in a conventional complementary color television camera suitable signal processing is performed so that the R, G, and B primary color signals are formed by performing the above-described conversion operation using equations (2)

through (4) and the W, $Y_E$, and $C_Y$ complementary color signals, and the luminance signal Y is formed by mixing the primary color signals at the ratio set forth in equation (2). Nevertheless, when such two operations are performed, noise mixing inevitably occurs and, even more problematical, this noise may be mixed over the whole frequency range of the luminance signal Y.

The level balance of the complementary color signals and the luminance reproducibility of the luminance signal Y are determined by the spectral sensitivity of each of the plurality of elements constituting the image pickup device and by color coding during conversion of the complementary color signals into the primary color signals.

As described above, in the conventional complementary color television camera the complementary color signals obtained from the image pickup device are processed simultaneously regardless of their respective frequencies. Therefore, when characteristics of the luminance signal are desired to be changed to meet a specific purpose, a luminance signal having such characteristics cannot be formed because of poor parameter flexbility.

In the conventional complementary color television camera it has been found to be difficult to maintain good luminance reproducibility, while effectively restricting folded signals and noise, by controlling the level balance of the complementary color signals.

OBJECTS AND SUMMARY OF THE INVENTION

Accordingly, it is an object of the present invention to provide luminance signal forming circuitry capable of forming a luminance signal having improved characteristics on the basis of complementary color signals, which circuitry can eliminate the above-noted defects inherent in the previously proposed systems.

It is another object of the present invention to provide a luminance signal forming circuit capable of selecting either good luminance reproducibility or noise reduction.

A further object of the present invention is to provide a luminance signal forming circuit capable of forming a luminance signal having high image quality by effectively restricting folded distortion.

A still further object of the present invention is to provide a luminance signal forming circuit capable of maintaining good luminance reproducibility that reliably keeps a good level balance of the complementary color signals, while effectively reducing noise.

Still another object of the present invention is to provide a luminance signal forming circuit in which the mixture ratio of the color components forming the luminance signal provides good luminance reproducibility and in which a low-noise luminance signal can be controlled in accordance with the amount of light from the image incident on the camera.

In accordance with an aspect of the present invention a composite luminance signal is produced in a complementary color video camera in which the foldover mixing or interference problem is dealt with and which it has a relatively low nosie level. In producing this composite luminance signal complementary color signals are level balanced using a sensitivity correction circuit that is responsive to the color temperature of the image being detected by the camera. At the same time white-balanced primary color signals are produced using the original complementary color signals and a gain control circuit that is also responsive to the detected color temperature of the image. The white-balanced primary color signals are then mixed with a specified ratio determined by the standards of the specific television scheme being employed, that is, NTSC, PAL, etc.

The level-balanced complementary color signals are added and fed through a high-pass filter that has a cut-off frequency based on the sampling frequency used to derive the color data, and the mixed white-balanced primary color signal is fed through a low-pass filter that has the same cut-off frequency as the high-pass filter. The outputs from these two filters are added to form the composite luminance signal having no foldover interference and low noise.

In accordance with another aspect of the present invention, th emixed, white-balanced primary color signal is proportionately combined with the level-balanced complementary color signal based upon the level of the original image signal as produced by the image pickup device. This image signal level is derived from an automatic gain control circuit typically employed in the signal path of the image pickup device.

The present invention also contemplates the provision of a composite luminance signal derived from level-balanced complementary color signals and white-balanced primary color signals, both of which are derived in response to the detected image color temperature by commonly using a single, color temperature correction circuit.

The above and other objects, features, and advantages of the present invention will become apparent from the following detailed descritpion of illustrative embodiment there of to be read in conjunction with the accompanying drawings, in which like reference numerals represent the same or similar elements.

DETAILED DESCRIPTION OF PREFERRED EMBODIMENTS

Figure 3:
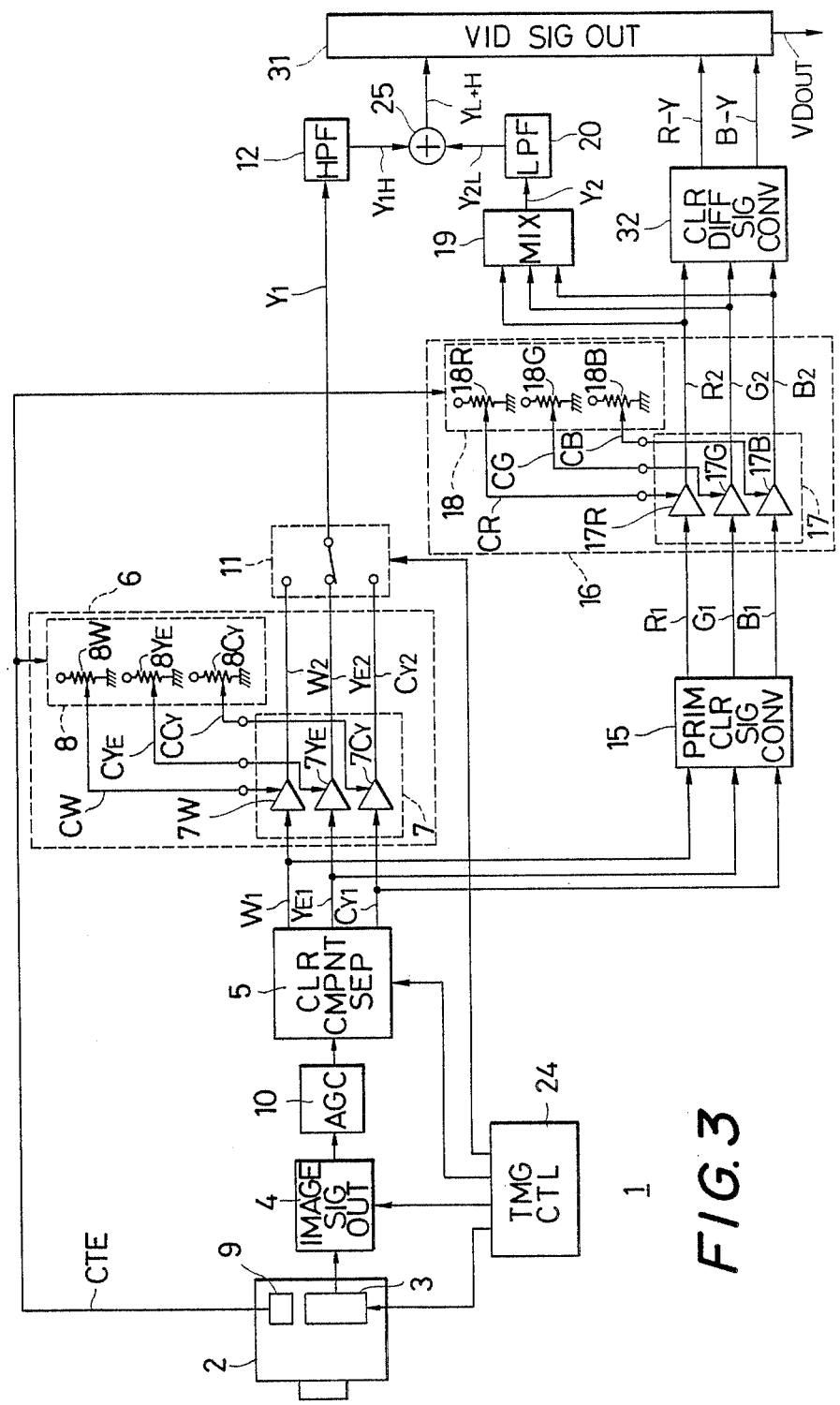
FIG. 3 is a schematic in block diagram form of an embodiment of a luminance signal forming circuit according to the present invention.

In FIG. 3 a video signal forming circuit 1 has a television camera 2 that includes an image pickup device 3, which may be constituted by CCD elements having complementary color filters. The output from image pickup device 3 is waveshaped by an image signal output circuit 4, gain controlled by an AGC circuit 10, and supplied to a color component separator 5. Color component separator 5 separates three selected complementary color signals $W_1$, $Y_{E1}$, and $C_{y1}$ from the total image signal and supplies the three signals to a sensitivity correction circuit 6. Sensitivity correction circuit 6 corrects for variations in sensitivity of the image pickup device 3 and includes variable gain amplifiers 7W, $7Y_E$, and $7C_Y$ that constitute a gain control circuit 7 and that receive the complementary color signals $W_1$, $Y_{E1}$, and $C_{Y1}$, respectively. The amplitudes of the complementary color signals $W_1$, $Y_{e1}$ and $C_{Y1}$ are respectively adjusted by the variable gain amplifiers 7W, $7Y_E$, and 7G in response to correction signals CW, $CY_E$, and $CC_Y$ derived from a color temperature correction circuit 8. Color temperature correction circuit 8 includes correction signal generators 8W, $8Y_E$, and $8C_Y$, which may comprise variable resistors, that are automatically adjusted in accordance with a color temperature detection signal CTE, which is produced by a color temperature detector 9 incorporated in television camera 2.

Thus, by use of sensitivity correction circuit 6, the respective levels of the complementary color signals $W_1$, $Y_{E1}$, and $C_{Y1}$ output from color component separators 5 are adjusted to a predetermined level $CR_0$, thereby supplying level-balance complementary color signals $W_2$, $Y_{E2}$, and $C_{Y2}$, to a switching-type signal adder 11.

Figure 1:
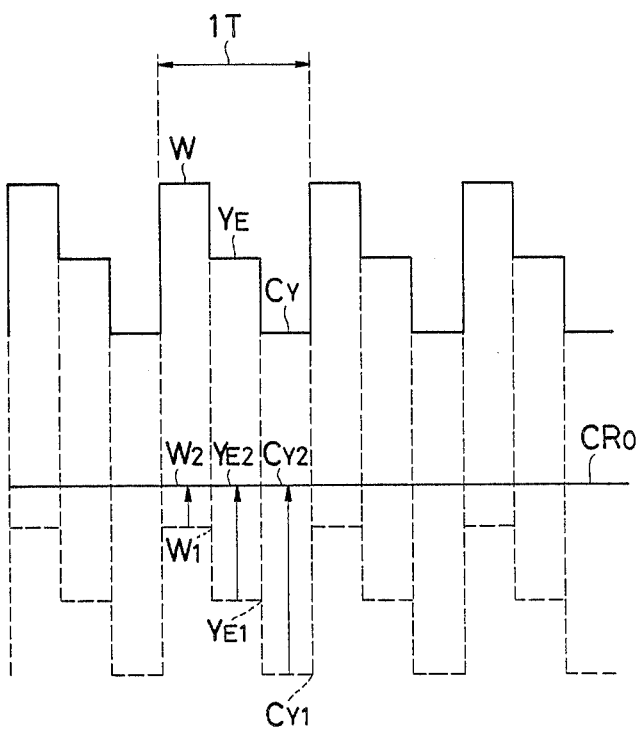
FIG. 1 is a graphical representation of signal waveforms useful in explaining problems in a luminance signal processing circuit of a television camera.

This level balancing operation is graphically represented in FIG. 1, from which it is seen that signal $W_1$ is level shifted by a selected amount to produce signal $W_2$ at the predetermined level $CR_0$. Similarly, color signals $Y_{E1}$ and $C_{Y1}$ are also level shifted by respective selected amounts in response to signal CTE from color temperature detector 9 to bring them as well to predetermined level $CR_0$.

Signal adder 11 performs a switching operation so as to seqeuentially select the complementary color signals $W_2$, $Y_{E2}$, and $C_{Y2}$ at the appropriate timing for obtaining complementary color signals W, $Y_e$, and $C_Y$, thereby obtaining a first luminance signal Y1 formed by sequentially and repeatedly outputting the level-balanced complementary color signals $W_2$, $Y_{E2}$, and $C_{Y2}$. This first luminance signal Y1 is then fed through a high-pass filter 12. A timing control circuit 24 that controls the operations of the several circuits at predetermined timings is only generally shown because the details of this control circuit form no part of the present invention and are, in any event, well known to one with ordinary skill in the video camera art.

Meanwhile, the complementary color signals $W_1$, $Y_{E1}$, and $C_{Y1}$ obtained from color component separator 5 are also supplied to a primary color signal converter 15. Primary color signal converter 15 is constituted by a matrix circuit and provides primary color signals $R_1$, $G_1$, and $B_1$, obtained by conversion based on equations (2) through (4). The primary color signals are fed to a white balance circuit 16 that includes a gain control circuit 17 comprised of variable gain amplifiers 17R, 17G, and 17b that receive the primary color signals $R_1$, $G_1$, and $B_1$ and adjust the amplitudes thereof using correction signals CR, CG, and CB obtained from correction signal generators 18R, 18G, and 18B, respectively. Color temperature correction circuit 18 includes correction signal generators 18R, 18G, and 18B that receive the color temperature detection signal CTE from color temperature detector 9 in television camera 2 and operate to change automatically the levels of the correction signals CR, CG, and CB in response to changes in the color temperature detection signal CTE. The respective amplitudes of the primary color signals $R_1$, $G_1$, and $B_1$ relative to each other are automatically adjusted by variable gain amplifiers 17R, 17G, and 17B in gain control circuit 17 in accordance with the color temperatures, so that when the color temperature changes, white balance circuit 16 supplies white-balanced primary color chorminance signals $R_2$, $G_2$, and $B_2$, each having a controlled color temperature, to a signal mixer 19. Mixer 19 mixes the white-balanced primary color chrominance signals $R_2$, $G_2$, and $B_2$ at the ratio set forth in equation (1) above, so as to generate a second luminance signal Y2, which is fed to a low-pass filter 20.

From FIG. 3 it is seen that the first luminance signal Y1 can be represented by:

$$Y1 = W_2 + Y_{E2} + C_{Y2} \tag{5}$$

in which the signal Y1 has a content obtained by adding the level-balanced complementary color signals $W_2$, $Y_{E2}$, and $C_{Y2}$. Components of these signals in the relatively high-frequency range, as determined by the cut-off frequency of high-pass filter 12, which may comprise signal components of 500 kHz or more, are extracted by high-pass filter 12 and supplied to a signal adder 25 as signal Y1H.

The result obtained by the operation of the circuit represented in equation (5) above is equivalent to the result obtained by adding the primary color signals R, G, and B at a ratio of 2:3:2, as given by equations (2) through (4) when they are represented by a general equation as follows:

$$\begin{aligned} Y1 &= W + Y_E + C_Y \\ &= (R + G + B) + (R + G) + (B + G) \\ &= 2R + 3G + 2B \end{aligned} \tag{6}$$

When the luminance signal Y1 of equation (6) is compared with the luminance signal Y of equation (1), it is apparent that both signals include the primary color signals R, G, and B at substantially the same ratios. While it is true that $0.3R + 0.59G + 0.11B$ is quite different from $2R + 3G + 2B$ mathematically, these two ratios produce practical results that are close to each other because the G component is leading or is the highest in both ratios.

Accordingly, a high-frequency range first luminance signal Y1H at the output of high-pass filter 12 is equivalent in practice to the result that would be obtained by mixing together the signal components in the frequency range above 500 kHz of each of the level-balanced complementary color signals $W_2$, $Y_{E2}$, and $C_{Y2}$ of the signal components of the luminance signal Y. The desired result is obtained using only one high-pass filter.

Figure 2:
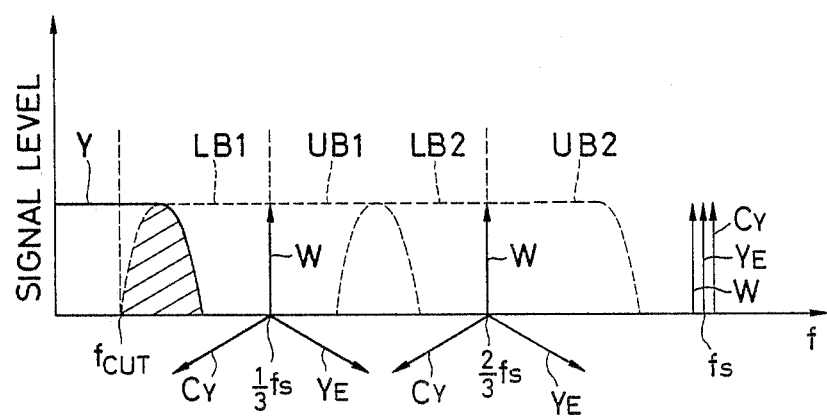
FIG. 2 is a graphical representation of characteristic curves useful in explaining problems in a conventional luminance signal processing circuit.

In the luminance signal Y1 with the above content, as described with reference to FIG. 2, the levels of the complementary color signals W, $Y_E$, and $C_Y$, each having a spatial frequency equivalent to $\frac{1}{3}$ the sampling frequency $f_s$, are equal to each other and have a mutual phase difference of 120°, so that they cancel each other. Hence, the result is equivalent to that wherein the lower sideband wave component LB1 and the upper sideband component UB1 (FIG. 2) are restricted or suppressed.

Accordingly, the luminance signal Y1H is formed by effectively removing the folded signal from the mixed luminance signal Y1 ($W_1 + Y_{E2\,1} + C_{Y2}$) at a frequency higher than the cutoff frequency ($f_{CUT} = 500$ kHz) of the high-pass filter 12 on the basis of the complementary color signals having a spatial frequency equivalent to ½ the sampling frequency $f_s$, thereby effectively preventing the possibility of generating folded distortion, which causes fringe patterns on the reproduced image, and obtaining a low-noise luminance signal.

The second luminance signal Y2 obtained from mixer 19 is formed by adding and mixing the white-balanced primary color signals $R_2$, $G_2$, and $B_2$ at the ratio of the primary color chrominance signals R, G, and B as determined by the NTSC standard television signals, that is, 0.3:0.59:0.11, as given by the following equation in the same manner as described with respect to equation (1).

$$Y2 = 0.3R_2 + 0.59G_2 + 0.11B_2 \qquad (7)$$

Therefore, the second luminance signal Y2 from mixer 19 has better luminance reproducibility or fidelity of the reproduced image, as comapred with the first luminance signal Y1 described above relative to the first condition, but has a larger amount of noise, as described above in relation to the third condition.

Signal components of the second luminance signal Y2 in the relatively low-frequency range are extracted by a low-pass filter 20 and provided as a low-frequency rnage second luminance signal Y2L.

Figure 4:
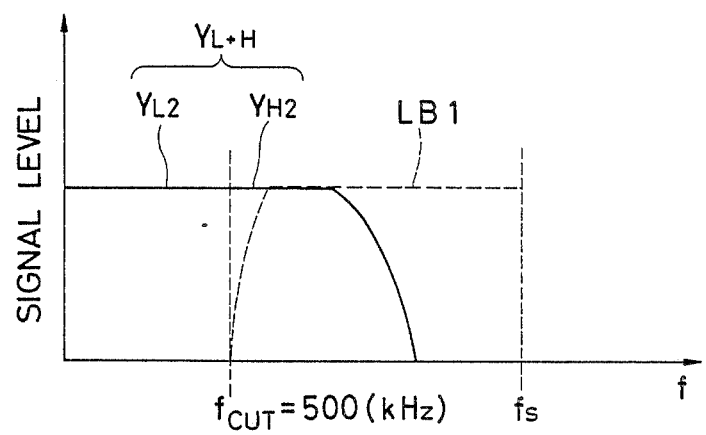
FIG. 4 is a graphical representation of a characteristic curve of a luminance signal.

The cutoff frequency $f_{CUT}$ of low-pass filter 20 is selected to equal that of high-pass filter 12 ($f_{CUT} = 500$ kHz). Thus, the luminance signal Y2L having good luminance reproducibility can be formed for the signal components of frequencies lower than the cutoff frequency $f_{CUT}$ of low-pass filter 20, as represented in FIG. 4. In other words, a luminance signal having good reproducibility with respect to an image having a relatively large area on the sccreen can be obtained.

An adder 25 adds the first and second luminance signals Y1H and Y2L and supplies a summed output signal to a video signal output circuit 31. as a composite luminance signal $Y_{L+H}$.

Color difference signals R−Y and B−Y that have been converted by a color difference signal converter 32 on the basis of the white-balanced primary color signals $R_2$, $G_2$, and $B_2$ are also provided to video signal output circuit 31. After a predetermined sync signal has been added to the color difference signals, an output video signal VD$_{OUT}$ is fed out as the output of video signal forming circuit 1.

According to the embodiment of FIG. 3, among the luminance signals formed on the basis of the complementary color signals W, $Y_E$, and $C_Y$, there is formed the signal component Y1H of the luminance signal in the high-frequency range, in which the folded signal component may be mixed, and this signal componet Y1H is controlled so that the complementary signals W, $Y_E$, and $C_Y$ are level-balanced. Thus, degradation of image quality that could be caused by the folded signal can be effectively prevented. In addition, the signal component Y2L of the luminance signal $Y_{L+H}$ in the relatively low-frequency range is formed as a luminance signal having good luminance reproducibility by mixing the primary signals R, G, and B at the ratio determined in the standard television scheme, which in this example is the NTSC system.

Figure 5:
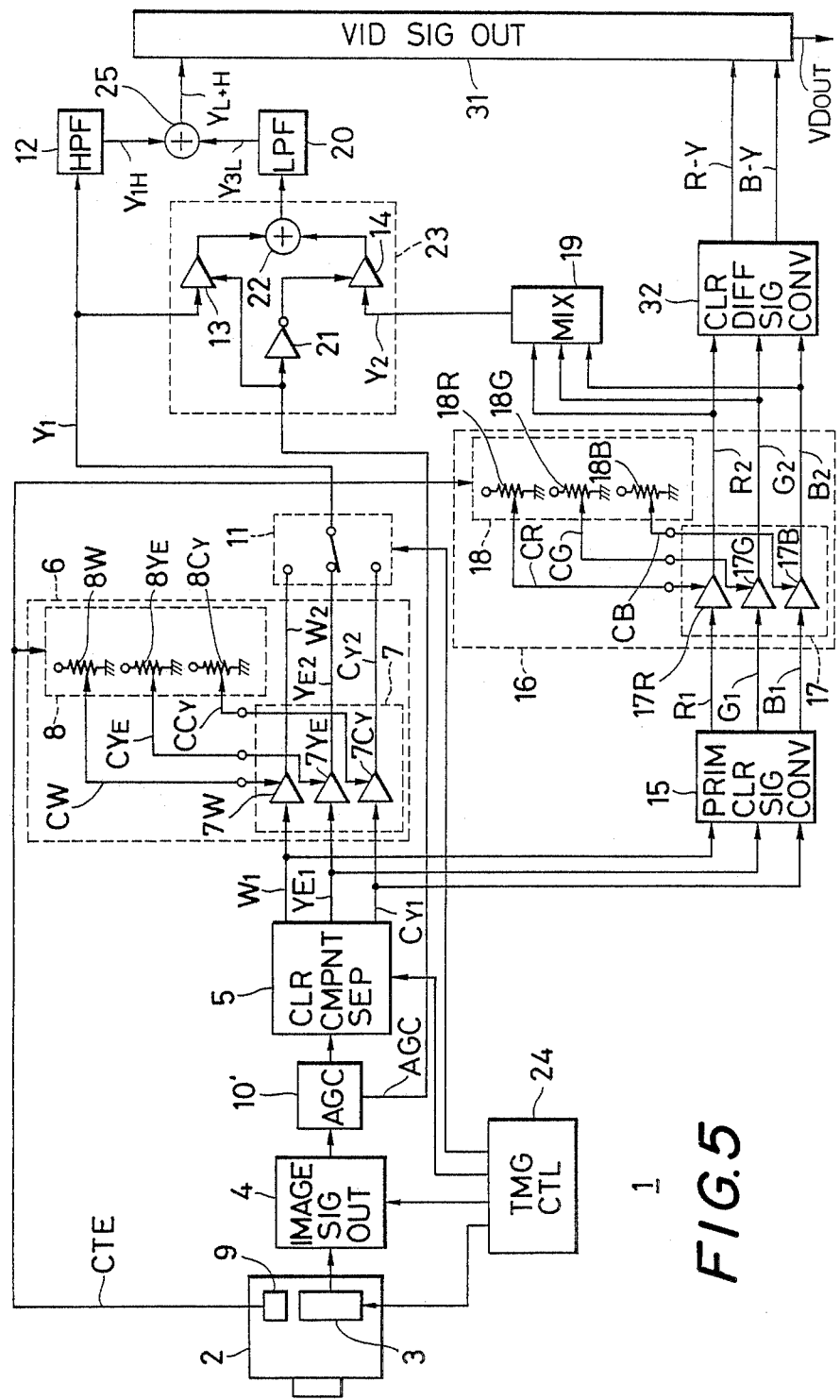
FIG. 5 is a schematic in block diagram form of another embodiment of a luminance signal forming circuit according to the present invention.

FIG. 5 shows a second embodiment of the present invention and in which the same reference numerals denote the same parts as in the embodiment of FIG. 3. In this second embodiment, in addition to the circuitry of the FIG. 3 embodiment a mixing ratio control circuit 23 comprising variable gain amplifiers 13 and 14, an inverter 21, and an adder 22 are provided. The first complementary color luminance signal Y1 produced by switch-adder 11 is once again supplied to high-pass filter 12, however, this signal is also fed to variable gain amplifier 13. The second luminance signal Y2 produced by mixer 19 is fed directly only to variable gain amplifier 14.

The gain of variable gain amplifier 13 is controlled by a gain control signal AGC obtained from an AGC circuit 10', which gain control signal is also used to control the gain of image signal produced by the image pickup device 3. The gain of variable gain amplifier 14 is controlled by a signal formed by inverting the AGC signal using inverter 21, so that variable gain amplifier is controlled by a control signal that varies in a direction opposite to the control direction of variable gain amplifier 13. Outputs from the variable gain amplifiers 13 and 14 are added by adder 22, and the summed output is fed through low-pass filter 20. Because the AGC signal changes in accordance with the amount of light incident on camera 1, the mixing ratio control circuit 23 operates to control the ratio of mixing between the two luminance signals Y1 and Y2 in response to the amount of light incident on the camera.

A composite luminance signal, which was obtained by mixing the luminance signals Y1 and Y2 at a ratio in accordance with the amount of light incident on the camera, is then fed to low-pass filter 20 so that a signal component of the luminance signal in the relatively low-frequency range is extracted and supplied to signal adder 25 as a third luminance signal Y3L.

Thus, when the amount of components of the luminance signal Y2 selected by the mixing ratio control circuit 23 is larger than that of the luminance signal Y1 in the frequency range that is below the cutoff frequency $f_{CUT}$ of low-pass filter 20, a luminance signal Y3L having good luminance reproducibility can be obtained. In other words, a luminance signal having good reproducibility, with respect to an image having a relatively large area on the screen, can be obtained.

When the amount of components of the luminance signal Y1 selected by the mixing ratio control circuit 23 is larger than that of the luminance signal Y2, the low-noise luminance signal Y3L can be obtained. In this case, the signal Y3L is very effective when an object has a low illuminated level and the amount of light incident on the camera is very small.

Signal adder 25 addes the first luminance signal Y1H and the third luminance signal Y3L, and the summed output is supplied to video signal output circuit 31 as the composite luminance signal $Y_{L+H}$.

According to the embodiment of FIG. 5, the mixing ratio between the low-noise first luminance signal Y1 and the second luminance signal Y2 having good luminance reproducibility is controlled by a control signal, such a the AGC signal, in the mixing ratio control circuit 23 so that more of one or the other of the luminance signals can be selected, as the specific light conditions demand.

Among the luminance signals derived from the complementary color signals W, $Y_E$, and $C_Y$, the signal component Y1H of the luminance signal in the high freqency range, which may have the folded signal component mixed therein, is controlled such that the complementary signals W, $Y_E$, and $C_Y$ are level-balanced, thereby preventing degradation of the reproduced image caused by the folded signal.

The signal component Y3L of the luminance signal $Y_{L+H}$ in the relatively low-frequency range can be formed by mixing the level-balanced luminance signal Y1 with the luminance signal Y2, in which signal Y2 is formed by mixing the primary color signals R, G, and B at the ratio determined by the standard television scheme (NTSC) to have good luminance reproducibility and at a mixing ratio determined in accordance with the amount of incident light (AGC).

Thus, as a whole, a luminance signal that has much better characteristics compared with that formed in the conventional manner can be obtained using the complementary color signals.

It is to be understood that mixing ratio control circuit 23 mayb e formed as a switch control circuit for switchably selecting one or the other of the luminance signals Y1 and Y2, according to a threshold value of the AGC signal.

Figure 6:
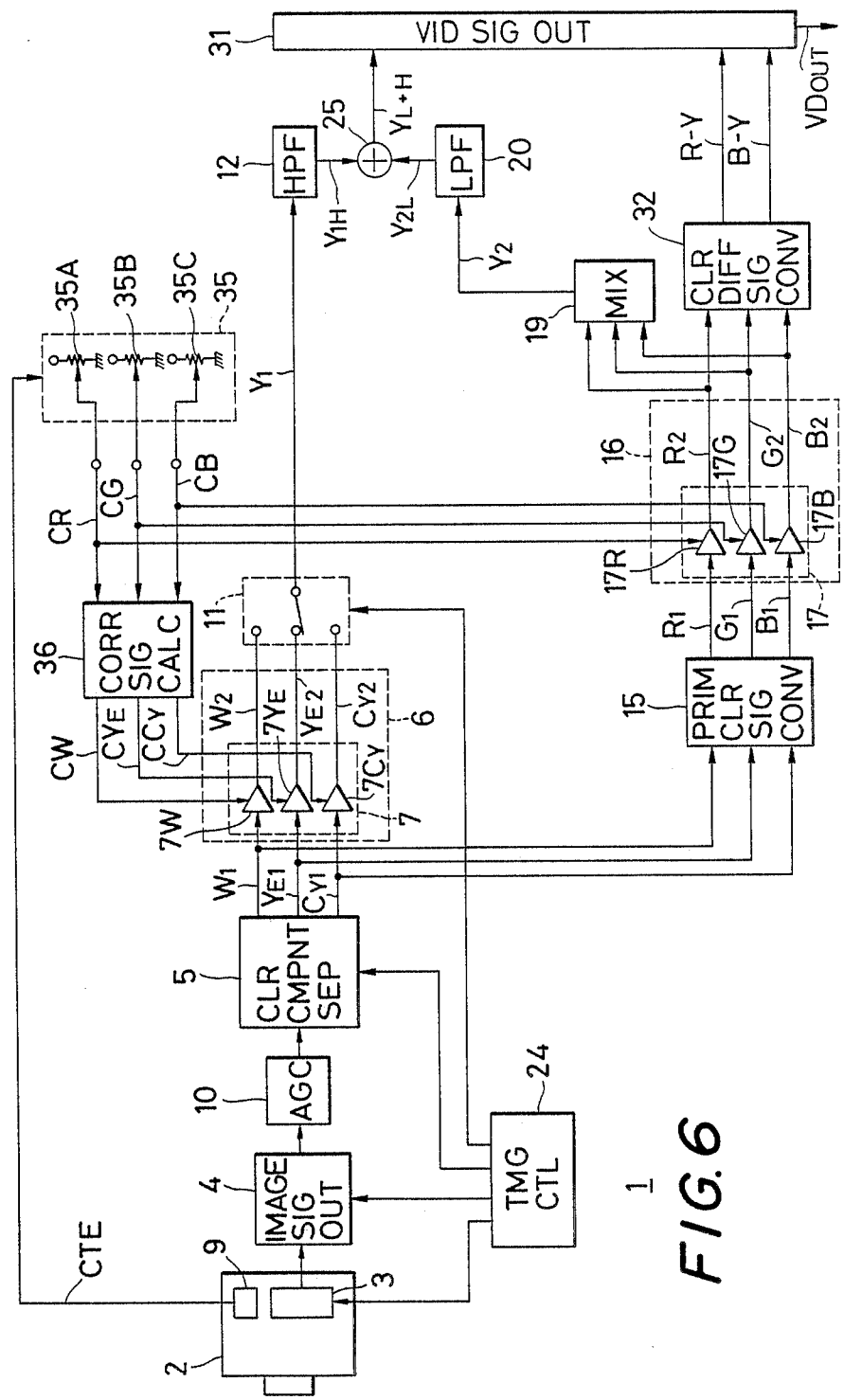
FIG. 6 is a schematic in block diagram form of still another embodiment of a luminance signal forming circuit according to the present invention.

FIG. 6 is a third embodiment of the present invention, in which the same reference numerals denote the same parts as in the embodiment of FIG. 3. This third embodiment provides a first set of correction signals CR, CG, and CG and a second set of correction signals CW, $CY_E$, and $CC_Y$ to be respectively supplied to gain control circuit 17 of white balance circuit 16 and to gain control circuit 7 of sensitivity correction circuit 6. More specifically, in FIG. 6 a color temperature correction circuit 35, which is responsive to the color temperature detection signal CTE, is commonly utilized by both sensitivity correction circuit 6 and white balance citcuit 16. The first set of correction signals CR, CG, and CB obtained from correction signal generators 35A, 35B, and 35C in the color temperature correction circuit 35 are used directly as the correction signals for gain control circuit 17 in white balance circuit 16. In addition, the first set of correction signals CR, CG, and CB are fed to a correction signal operation circuit 36 in which a predetermined conversion operation is performed, thereby forming the second set of correction signals CW, $CY_E$, and $CC_Y$ fed to the gain control circuit 7 in sensitivity correction circuit 6.

More specifically, it if is assumed that white-balanced primary color signals $R_2$, $G_2$, and $B_2$ are obtained using the correction signals CR, CG, and CB in gain control circuit 17, as represented by the following:

$$|R_2|=|G_2|=|B_2|=K \qquad (8)$$

Then correction signal operation circuit 36 is arranged on the basis of the below relationship to generate the correction signals CW, $CY_E$, and $CC_Y$ required for obtaining the level-balanced complementary color signals $W_2$, $Y_{E2}$, and $C_{Y2}$ having the same level, as represented by the following equation based on the complementary color signals $W_2$, $Y_{E1}$, and $C_{Y1}$ supplied from color component separator 5 in gain control circuit 7:

$$|W_2|=|Y_{E2}|=|C_{Y2}|=CR_0 \qquad (9)$$

In order to form the white-balanced primary color signals $R_2$, $G_2$, and $B_2$ from the complementary color signals $W_1$, $Y_{E1}$, and $C_{Y1}$ supplied from color component separator 5, primary color signal converter 15 and gain control circuit 17 in white balance circuit 16 are arranged to perform the following calculation:

$$\begin{bmatrix} R_2 \\ G_2 \\ B_2 \end{bmatrix} = \begin{bmatrix} G_R & 0 & 0 \\ 0 & G_G & 0 \\ 0 & 0 & G_B \end{bmatrix} \begin{bmatrix} \text{MATRIX} \end{bmatrix} \begin{bmatrix} W_1 \\ Y_{E1} \\ C_{Y1} \end{bmatrix} \qquad (10)$$

Where $G_R$, $G_G$, and $G_B$ are respective white-balance control gains to be prorivded to the primary color chrominance signals R, G, and B in gain control circuit 17 and the MATRIX is a matrix representing the operational expression for converting the complementary color signals $W_1$, $Y_{E1}$,a nd $C_{Y1}$ into the primary color signals $R_1$, $G_1$, and Bhd 1 in primary color signal converter 15.

Equation (10) can be converted so as to express the complementary color signals $W_1$, $Y_{e1}$, and $C_{Y1}$ as follows:

$$\begin{bmatrix} W_1 \\ Y_{E1} \\ C_{Y1} \end{bmatrix} = \qquad (11)$$

$$\left( \begin{bmatrix} G_R & 0 & 0 \\ 0 & G_G & 0 \\ 0 & 0 & G_B \end{bmatrix} \begin{bmatrix} \text{MATRIX} \end{bmatrix} \right)^{-1} \begin{bmatrix} R_2 \\ G_2 \\ B_2 \end{bmatrix} =$$

$$\begin{bmatrix} \text{MATRIX} \end{bmatrix}^{-1} \begin{bmatrix} 1/G_R & 0 & 0 \\ 0 & 1/G_G & 0 \\ 0 & 0 & 1/G_B \end{bmatrix} \begin{bmatrix} R_2 \\ G_2 \\ B_2 \end{bmatrix}$$

Because in the white-balanced condition, equation (8) can be established in equation (11), a substitution of equation (8) into equation (11) yields the complementary color signals $W_1$, $Y_{E1}$, and $C_{Y1}$ as follows:

$$|W_1|=K(a_{11}/G_R+a_{12}/G_G+a_{13}/G_B) \qquad (12)$$

$$|Y_{E1}|=K(a_{21}/G_R+a_{22}/G_G+a_{23}/G_B) \qquad (13)$$

$$|C_{Y1}|=K(a_{31}/G_R+a_{32}/G_G+a_{33}/G_B) \qquad (14)$$

where $a_{ij}$ (i=1, 2, 3 and j=1, 2, 3) is an element of an inverse matrix $[MAT]^{-1}$.

A gain of each of the complementary color signals $W_1$, $Y_{E1}$, and $C_{Y1}$ can be obtained so as to establish equation (9) by setting the complementary color signals $W_1$, $Y_{E1}$, and $C_{Y1}$ at the same level $CR_0$ in equations (12) through (14), as follows:

$$G_W = M/|W_1| \qquad (15)$$
$$= M/K(a_{11}/G_R + a_{12}/G_G + a_{13}/G_B)$$

$$G_{YE} = M/|Y_{E1}| \qquad (16)$$
$$= M/K(a_{21}/G_R + a_{22}/G_G + a_{23}/G_B)$$

$$G_{CY} = M/|C_{Y1}| \qquad (17)$$
$$= M/K(a_{31}/G_R + a_{32}/G_G + a_{33}/G_B)$$

Since equations (15) through (17) represent the relationship between the gains required for the white balance and the gains for the level balance, the gain K of the white balance is obtained based on the correction signals CR, CG, and CB provided to establish the white balance in establishing equation (8). If the complementary color signals $W_2$, $Y_{E2}$, and $C_{Y2}$, having a level coinciding with the level $CR_0$ of the predetermined level balance upon substitution of the gain K into equations (15) through (17), are obtained by the operations in correction signal operation circuit 36, voltage values of the correction signals CW, $C_{YE}$, and $C_{CY}$ required for obtaining the level-balanced complementary chrominance signals $W_2$, $Y_{E2}$, and $C_{Y2}$ can be obtained in the level-balanced state.

If gain control circuit 17 is controlled by the correcvtion signals CR, CG, and CB thus obtained, the white-balance primary color chrominance signals $R_2$, $G_2$, and $B_2$ can be obtained. If the gain control circuit 7 is controlled by the correction signals CW, $CY_E$, and $CC_Y$, the level-balanced complementary chrominance signals $W_2$, $Y_{E2}$, and $C_{Y2}$ can be obtained.

In the embodiment of FIG. 6, the overall circuit for forming the correction signals is further simplified by using a single color temperature correction circuit 35 for commonly obtaining the correction signals CW, $CY_E$, and $CY_E$ for forming the level-balanced complementary color signals W, $Y_E$, and $C_Y$ and for forming the white-balanced primary color signals R, G, and B.

Figure 7:
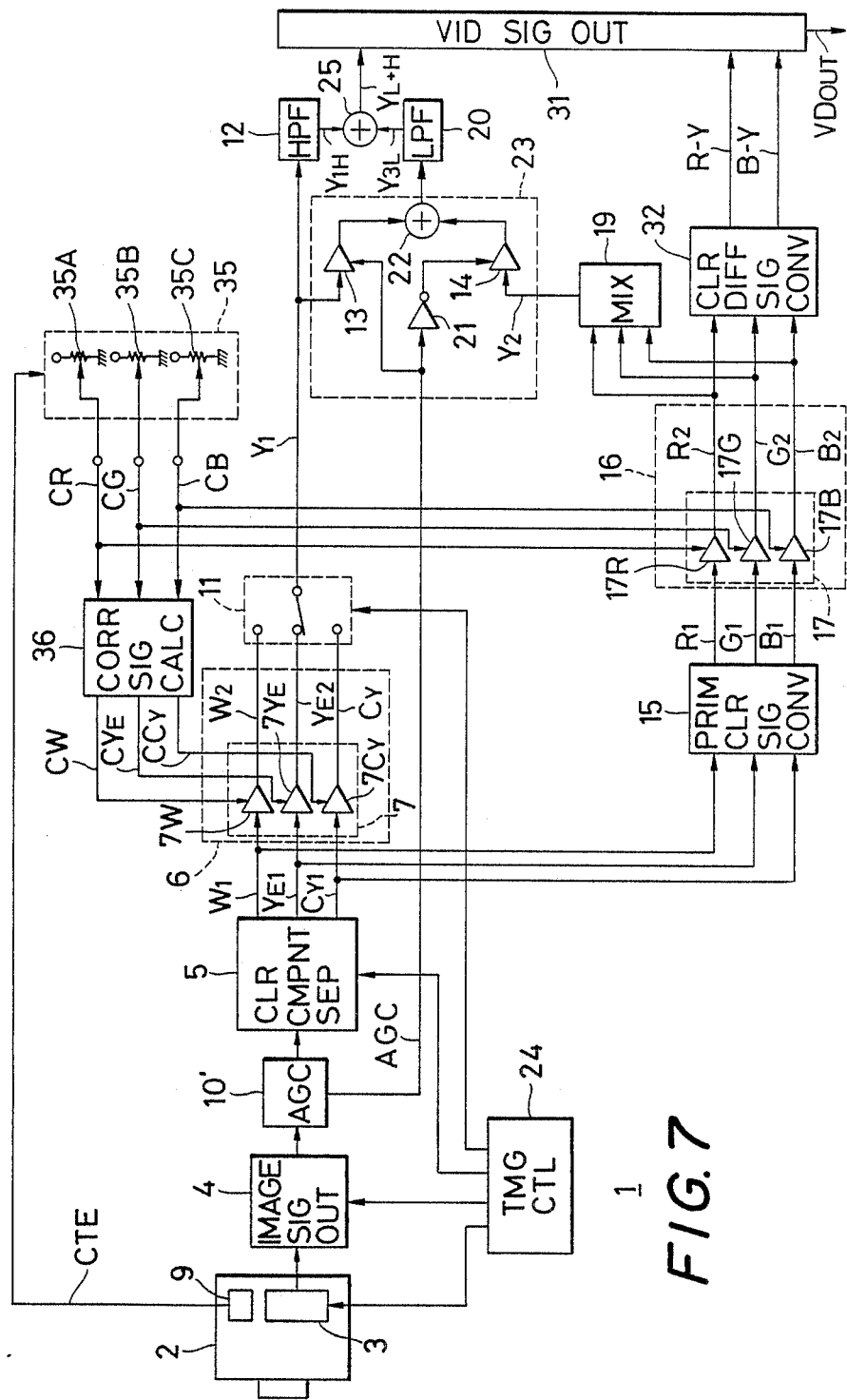
FIG. 7 is a schematic in block diagram form of yet another embodiment of a luminance signal forming circuit according to the present invention.

FIG. 7 shows a fourth embodiment according to the present invention in which the same reference numerals denote the same parts as in the embodiments shown in FIGS. 3, 5, and 6. The embodiments of FIG. 7 is constructed y providing mixing ratio control circuit 23 of the embodiment of FIG. 5 to the embodiment shown in FIG. 6. Thus, the single color temperature correction circuit 35 is used for obtaining both the level-balanced complementary color signals as well as the white-balanced primary color signals and these two luminance signals are proportionally combined to form the input signal to low-pass filter 20 in response to the level of the image signal as represented by the AGC signal from automatic gain control circuit 10'.

Although the embodiments described above are arranged so that after the complementary color signals W, $Y_E$, and $C_Y$ are level-balanced by gain control circuit 7, the resultant signals are switched and added by the switch circuit 11, a signal adding circuit may be used in place of the switch circuit 11, so as to mix the signals by addition.

Furthermore, the television camera 2 using the W, $Y_E$, and $C_Y$ complementary color filters is described in the above embodiments, such complementary filters are not limited to this arrangement and various other filter arrangements can be used.

In the embodiments described in regard to FIGS. 6 and 7, although the correction signals CW, $CY_E$, and $CC_Y$ are calculated based on the correction signals CR, CG, and CB, the same effect can be obtained by calculating correction signals CR, CG, and CB on the basis of the correction signals CW, $CY_E$, and $CC_Y$ generated by the color temperature correction circuit 35.

The above description is given on a single preferred embodiment of the invention, but it will be apparent that many modifications and variations could be effected by one skilled in the art without departing from the spirit or scope of the novel concepts of the invention, which should be determined by the appended claims.

What is claimed is:

1. A luminance signal forming circuit in a television camera having complementary color filtering, comprising:
   first means for producing a first luminance signal by mixing a plurality of complementary color signals separated from an output of the television camera;
   second means for producing a second luminance signal formed by mixing at a predetermined ratio a pluraliyt of primary color signals based on said plurality of complementary color signals; and
   signal combining means for combining said first and second luminance signals to produce a composite luminance output signal.

2. A circuit according to claim 1, wherein said first means includes level balancing means for setting said plurality of complementary color signals at substantially identical levels and means for mixing said plurality of complementary color signals having the substantially identical levels into a single, level-balanced complementary color signal, and said second means comprises white balancing means for obtaining a plurality of white-balanced primary color signals from said plurality of primary color signals and means for mixing said plurality of white-balanced primary color signals at said predetermined ratio.

3. A circuit according to claim 2, further comprising means for detecting the color temperature of an image detected by the camera and in which said firs tmeans includes first color temeprature correction means responsive to said detected image color temperature for causing said level balancing means to adjust the levels of said complementary color signals in response to a first correction signal obtained from said first color temperature correction means.

4. A circuit according to claim 2, further comprising means for detecting the color temperature of an image detected by the camera and in which said second means includes second color temperature correction means responsive to said detected image color temperature for causing said white balancing means to balance said primary color signals in response to a second correction signal obtained from said second color temperature correction means.

5. A circuit according to claim 2, further comprising means for detecting the color temperature of an image detected by the camera and color temperature correction means responsive to said detected image color temperature for causing one of said white balancing means and said level balancing means to adjust the levels of its respective signal in response to a first color temperature correction signal; and means for producing a second color temperature correction signal from said first color temperature correction signal, said second color temperature correction signal being fed to the other of said white balancing means and said level balancing means.

6. A circuit according to claim 1, wherein a signal combining ratio of said signal combining means is variable.

7. A circuit according to claim 6, wherein said signal combining ratio is varied in response to the amount of light incident on the television camera.

8. A circuit according to claim 6, further comprising an automatic gain control circuit responsive to the amount of light incident on the television camera, and wherein said signal combining ratio is varied by an AGC signal obtained form said automatic gain control circuit.

9. A luminance signal forming circuit for a complementary color filter television camera, comprising:
- level-balance processing means for obtaining a first luminance signal by mixing a pluraliyt of complementary color signals separated from an output of the television camera after setting said pluraliyt of complementary color signals at substantially identical levels;
- white-balance processing means for obtaining a second luminance signal by mixing at a predetermined ratio a plurality of primary color signals, obtained from said plurality of complementary color signals, after white-balancing said plurality of primary color signals;
- means for extracting high-frequency components from said first luminance signal;
- means for extracing low-frequency components from said second luminance signal; and
- mixing means for mixing said high- and low-frequency components to produce a composite luminance signal.

10. A circuit according to claim 9, further comprising first color temperature correction means for causing said white-balance processing means to balance said primary color signals using first correction signals obtained from a first color temperature correction circuit responsive to the color temperature of an image detected by the camera.

11. A circuit according to claim 9, further comprising second color temperature correction means for causing said level-balance processing means to adjust the levels of said complementary color signals using second correction signals obtained from a second color temperature correction circuit responsive to the color temperature of an image detected by the camera.

12. A circuit according to claim 9, further comprising color temperature correction means for causing one of said white-balance processing means and said level-balance processing means to adjust the levels of its respective signals using a first color temperature correction signal; and a correction signal calculating circuit for calculating a second color temperature correction signal from said first color temperature signal, said second color temperature correction signal being fed to the other of said white-balance processing means and said level-balance processing means.

13. A circuit according to claim 9, wherein a mixing ratio of said mixing means is variable.

14. A circuit according to claim 13, wherein said mixing ratio is varied in accordance with the amount of light incident on the television camera.

15. A circuit according to claim 13, further comprising an automatic gain control circuit responsive to the amount of light incident on the television camera, and wherein said mixing ratio is varied by an AGC signal obtained from said automatic gain control circuit.

16. A luminance signal forming circuit, comprising:
- a television camera having complementary color filtering;
- level-balance processing means for obtaining a first luminance signal by mixing a plurality of complementary color signals separated from an output of said television camera after setting said plurality of complementary color signals at substantially identical levels;
- white-balance processing means for obtaining a second luminance signal by mixing at a predetermined ratio a plurality of primary color signals obtained on the basis of said plurality of complementary color signals after white-balancing said plurality of primary color signals;
- mixing means for mixing said first and second luminance signals to produce a third luminance signal;
- means for extracting a high-frequency range component from said first luminance signal;
- means for extracting a low-frequency range component from said third luminance signal; and
- mixing means for mixing said high- and low-frequency range components to produce a composite luminance signal.

17. A circuit according to claim 16, further comprising means for detecting the color temperature of an image detected by the camera and in which said level-balance processing means includes first color temperature correction means responsive to said detected image color temperature for causing said level-balance processing means to adjust the levels of said plurality of complementary color signals in response to a first correction signal obtained from said first color temperature correction means.

18. A circuit according to claim 16, further comprising means for detecting the color temperature of an image detected by the camera and in which said white-balance processing means includes second color temperature correction means responsive to said detected image color temperature for causing said white-balance processing means to balance said plurality of primary color signals in response to a second correction signal obtained from said second color temperature correction means.

19. A circuit according to claim 16, further comprising color temperature correction means for causing at least one of said white-balance processing means and said level-balance processing means to adjust the levels of its respective signals in response to a first color temperature correction signal; and a correction signal calculating circuit for calculating a second color temperature correction signal from said first color temperature correction signal, said second color temperature correction signal being fed to the other of said white-balance processing means and said level-balance processing means.

20. A circuit according to claim 16, wherein a mixing ratio of said mixing means is variable.

21. A circuit according to claim 20, wherein said mixing ratio is varied in accordance with the amount of light incident on the camera.

22. A circuit according to claim 20, further comprising an automatic gain control circuit responsive to the amount of light incident on the television camera, and wherein said mixing ratio is varied by an AGC signal obtained from said automatic gain control circuit.

* * * * *

UNITED STATES PATENT AND TRADEMARK OFFICE
CERTIFICATE OF CORRECTION

PATENT NO. : 4,805,011

DATED : February 14, 1989

INVENTOR(S) : Masatoshi Sase

It is certified that error appears in the above-identified patent and that said Letters Patent is hereby corrected as shown below:

Column 1, line 43, change "through" to --thought--.
Column 2, line 1, change "filtesr" to --filters--;
         line 33, "and" should not be in italics;
         line 36, change "W." to --W,--.
Column 3, line 23, change "flexbility" to --flexibility--.
Column 4, line 33, change "descritpion" to --description--;
         line 34, change "embodiment" to --embodiments--;
         same line, change "there of" to --thereof--.
Column 5, line 24, change "level-balance" to --level-balanced--;
         line 25, after "$Cy_L$" delete ",".
Column 6, line 67, change "CY2" to --$Cy_L$--.
Column 7, line 20, change "comapred" to --compared--;
         line 27, change "rnage" to --range--;
         line 36, change "sccreen" to --screen--;
         line 39, after "31" delete ".";
         line 54, change "componet" to --component--.
Column 8, line 22, change "1" to --2--;
         line 47, change "illuminated" to -- illumination--;
         line 49, change "addes" to --adds--;
         line 59, change "a" to --as--;
         line 66, change "freqency" to --frequency--.
Column 9, line 17, change "mayb e" to --may be--;

UNITED STATES PATENT AND TRADEMARK OFFICE
CERTIFICATE OF CORRECTION

PATENT NO. : 4,805,011

DATED : February 14, 1989

INVENTOR(S) : Masatoshi Sase

It is certified that error appears in the above-identified patent and that said Letters Patent is hereby corrected as shown below:

Column 9, line 25, change "CG" second occurence to --CB--;
         line 32, change "citcuit" to --circuit--;
         line 50, change "$B_2$" to --$B_2$--.

Column 10, line 8, change 'prorivded" to --provided--;
         line 12, change "$Y_{E1}$,a nd" to --$Y_{E1}$, and--;
         line 13, change "Bhd 1" to --$B_1$--;
         line 16, change "$Y_{e1}$" to $Y_{E1}$--.

Column 11, line 13, change "correcv-" to --correc--;
         line 16, change "$B_2$can" to --$B_2$ can--;
         line 31, change "y" to --by--;
         line 54, change "$CY_E$,a nd" to --$CY_E$, and--.

IN CLAIMS

Column 12, line 9, change "pluraliyt" to -- plurality--;
         line 28, change "firs tmeans" to --first means--;
         line 29, change "temeprature" to --temperature--;
         line 50, change "signal" to --signals--;
         line 67, change "form" to --from--.

UNITED STATES PATENT AND TRADEMARK OFFICE
CERTIFICATE OF CORRECTION

PATENT NO. : 4,805,011

DATED : February 14, 1989

INVENTOR(S) : Masatoshi Sase

It is certified that error appears in the above-identified patent and that said Letters Patent is hereby corrected as shown below:

Column 13, line 4, change "pluraliyt" to --plurality--;

line 6, change "pluraliyt" to --plurality--.

Signed and Sealed this

Twenty-third Day of January, 1990

Attest:

JEFFREY M. SAMUELS

Attesting Officer     Acting Commissioner of Patents and Trademarks